(12) United States Patent
Simard et al.

(10) Patent No.: US 7,942,620 B2
(45) Date of Patent: May 17, 2011

(54) TIRE HANDLING APPARATUS

(76) Inventors: Real Simard, Normandin (CA); Martin Simard, Normandin (CA)

( * ) Notice: Subject to any disclaimer, the term of this patent is extended or adjusted under 35 U.S.C. 154(b) by 340 days.

(21) Appl. No.: 11/297,538

(22) Filed: Dec. 8, 2005

(65) Prior Publication Data
US 2007/0134080 A1   Jun. 14, 2007

(51) Int. Cl.
*B60B 30/10* (2006.01)
(52) U.S. Cl. ........ 414/426; 414/427; 280/79.4; 187/211
(58) Field of Classification Search .................. 414/426, 414/427, 428; 280/79.3, 79.4; 187/211
See application file for complete search history.

(56) References Cited

U.S. PATENT DOCUMENTS

| | | | |
|---|---|---|---|
| 2,645,538 A * | 7/1953 | Segal | 108/145 |
| 3,301,419 A | 1/1967 | Molden et al. | |
| 3,830,387 A * | 8/1974 | Virnig | 414/427 |
| 4,078,759 A * | 3/1978 | Lanier | 249/18 |
| 4,123,038 A | 10/1978 | Meyers | |
| 5,232,035 A | 8/1993 | Adams, Jr. | |
| 5,823,357 A * | 10/1998 | Sieradzki et al. | 209/703 |
| 6,095,745 A * | 8/2000 | Garnett | 414/427 |
| 6,279,306 B1 * | 8/2001 | Langen | 57/281 |
| 7,044,569 B1 * | 5/2006 | Relyea et al. | 312/249.11 |

* cited by examiner

*Primary Examiner* — Michael S Lowe

(57) ABSTRACT

A tire handling apparatus comprises a structural body composed of a hydraulically actuated scissor lift assembly for adjusting the height of a tire receiving platform; a movable plank that can be stowed away when not in use but is protruding off the side of the body so that it can receive a tire removed from a vehicle. The plank slides longitudinally across the length of the receiving platform so as to be in line with an empty receiving niche. The structural body is on wheels so that the tire handling apparatus can be moved from location to location as required.

8 Claims, 7 Drawing Sheets

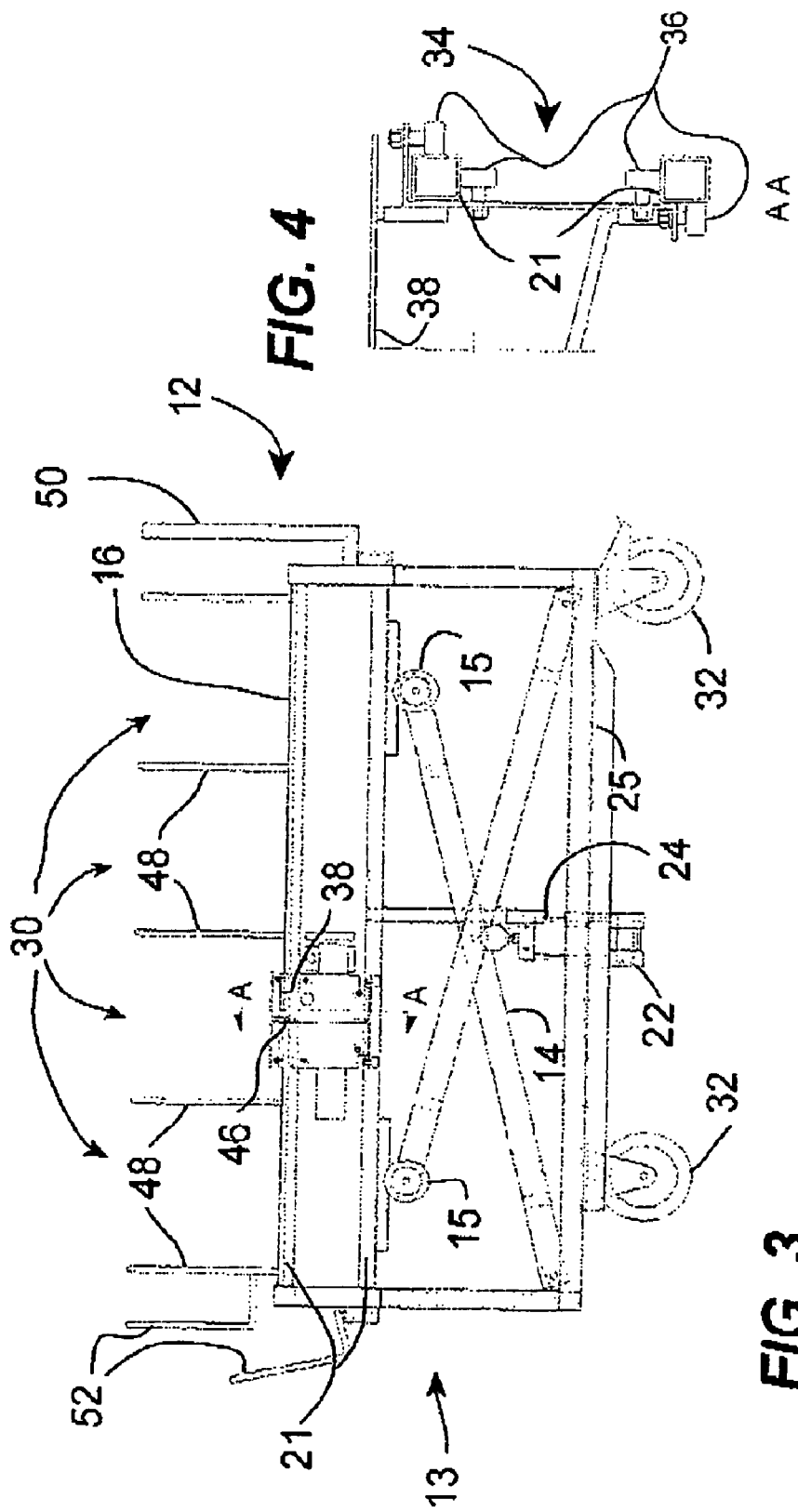

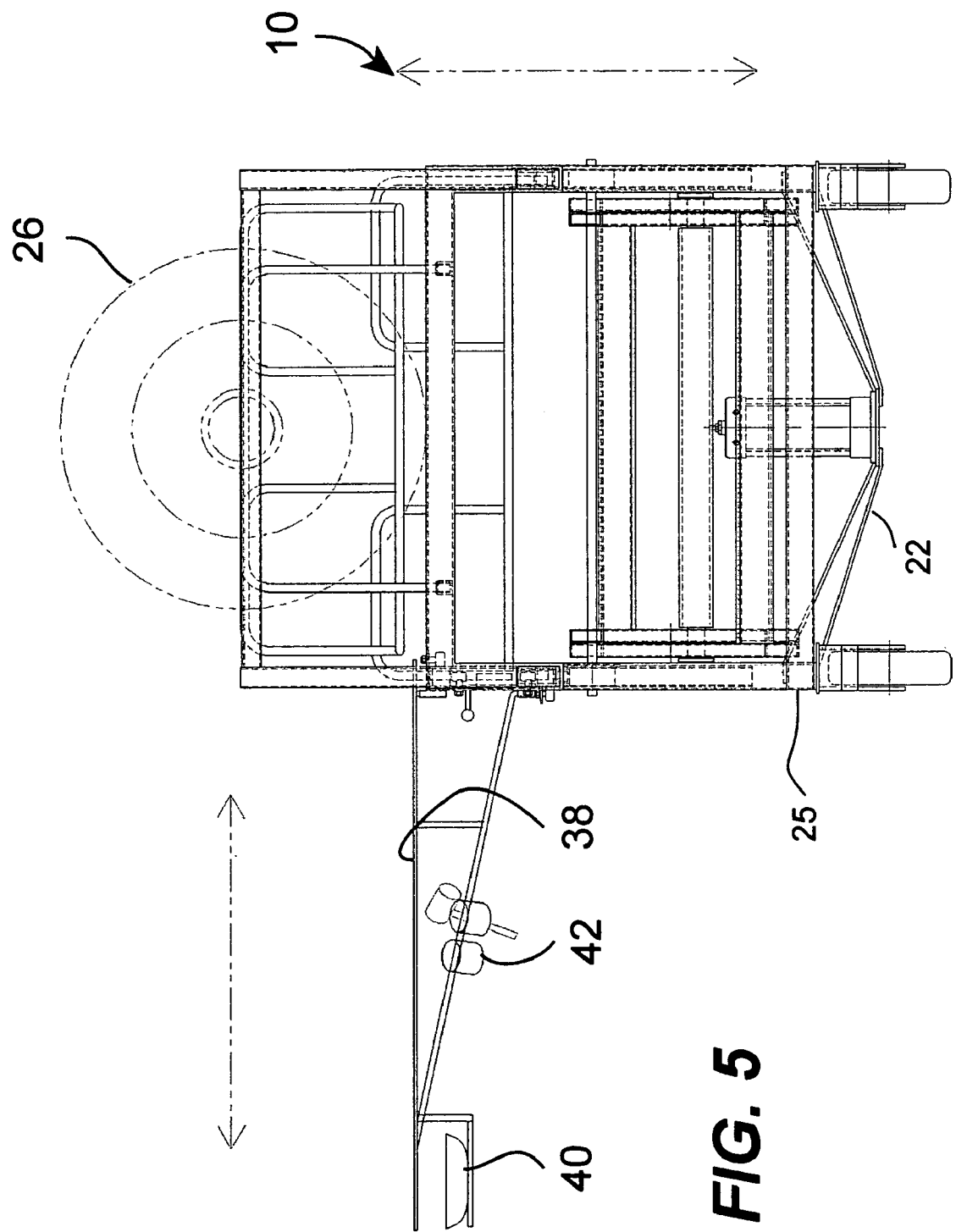

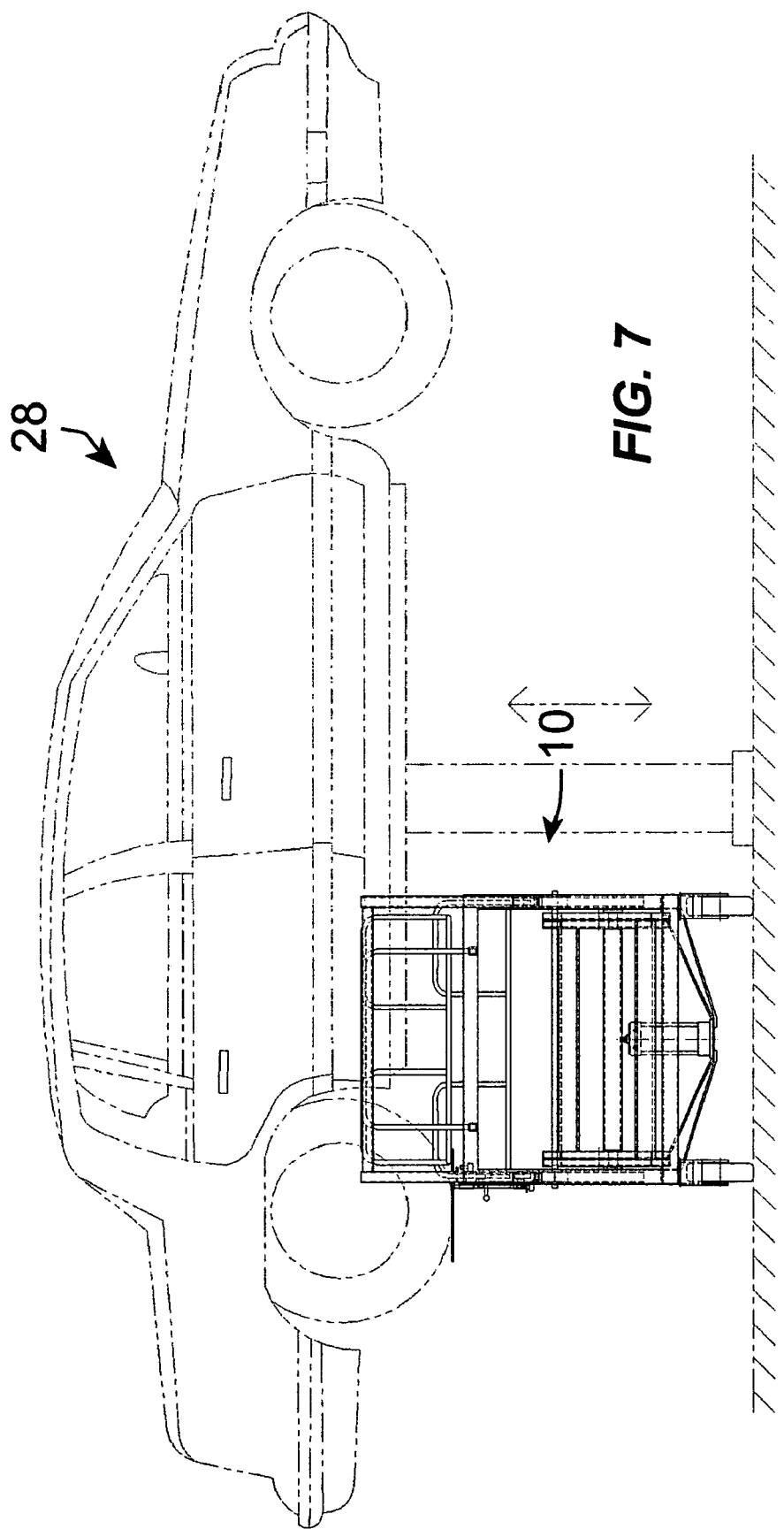

TIRE HANDLING APPARATUS

BACKGROUND OF THE INVENTION

1. Field of the Invention

Figure 1:
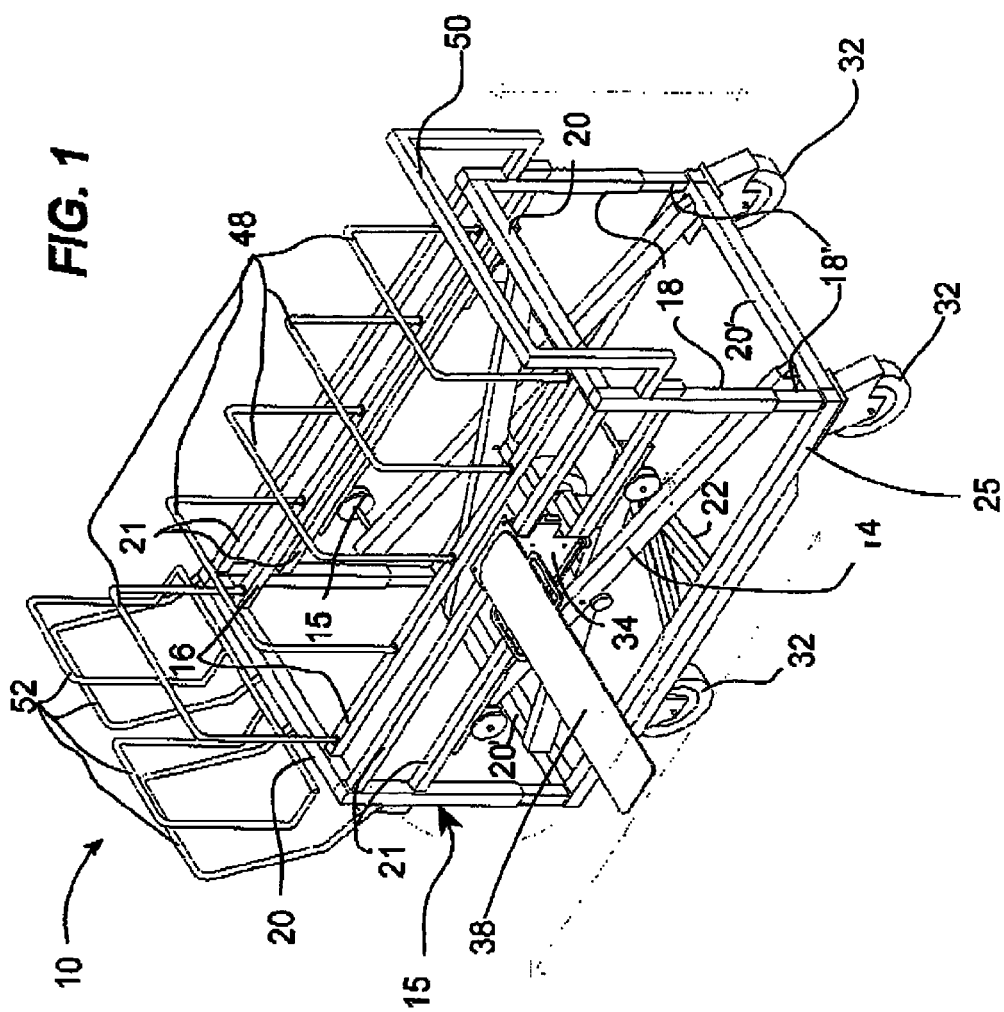

The invention relates generally to repair equipment but more particularly to a device for handling tires being removed from a vehicle in the context of a service location.

2. Background of the Invention

Removing tires off a vehicle can be, in the long run, a source of work injury. Indeed, although tires are not exceedingly heavy, they do involve a series of movements that can be a source of injury due to the repetitiveness of certain movements or the imbalance incurred in the process of executing certain movements.

To remedy this situation, some inventors have come up with partial solutions to the problem.

U.S. Pat. No. 3,301,419 discloses a lift on which wheels are held by elongated members which are supported on both ends thus eliminating bending inherent in a cantilever support. Also, there is a means for supporting the wheels in an upright position while they are on the lift so that the wheels can be rotated for adjusting purposes.

U.S. Pat. No. 4,123,038 discloses a wheel lift apparatus for supporting a load, comprising a mobile base frame having caster mounted side frame members telescopically extensible in a longitudinal direction, a cross frame member rigidly interconnecting the side frame members in laterally fixed, substantially parallel relationship, and vertical guide means projecting upwardly from the cross frame member; a lift frame vertically movable relative to the base frame including laterally spaced L-shaped lift arms having horizontal, load supporting arm members and vertical arm members interconnected by a lateral cross member, and slide means carried by the vertical arm members for cooperable action with the guide members of the base frame; a horizontally adjustable load contacting frame carried by the vertical arm members of the lift frame; and another vertically adjustable, load supporting frame carried by the base frame.

U.S. Pat. No. 5,232,035 discloses a tire changing tool and universal workstand for use in a tire store or mechanic shop that has a base having a vertically extending post attached thereto. The work support members include a vehicle wheel work support attachment removably attached to the top of the post for attaching and holding a vehicle wheel to the tire changing tool. The wheel attachment is attached to the post end so that the wheel can be fixedly attached and held in a horizontal plane. A tire removing tool is removably attached to one side of the post and positioned so that a wheel having a tire thereon can be placed adjacent the post so that the tire removing tool can be positioned adjacent the wheel rim flange against the tire and is leveraged for driving the tool to break the tire edge from the tire rim. The work support attachment is attached to the top of the vertically extending post with a post coupling having a square insert inserted into a square post top opening and having a flange cap thereover and having the vehicle wheel work support attached thereto. The wheel work support can be rapidly removed from the vertical post for converting the tire changing tool to a different type of work station.

These inventions only solve part of the problem and therefore, there is a need for a better tire changing apparatus.

SUMMARY OF THE INVENTION

In view of the foregoing disadvantages inherent in the known devices now present in the prior art, the present invention, which will be described subsequently in greater detail, is to provide objects and advantages which are:

To provide for a tire handling apparatus which minimizes the amount of repetitive movements.

To provide for a tire handling apparatus which reduces the strength required for moving a tire.

To provide for a tire handling apparatus which is easy to use.

To provide for a tire handling apparatus which adjusts to a variety of heights.

To provide for a tire handling apparatus which is easy to move around.

To provide for a tire handling apparatus which can handle several tires.

To provide for a tire handling apparatus which transports the tires to a different location once they are removed from a vehicle.

To provide for a tire handling apparatus which allows for easy offloading or uploading of the tires to their storage destination or onto other machines for further processing of the tires.

To attain these ends, the present invention generally comprises a structural body composed of a hydraulically actuated scissor lift assembly for adjusting the height of a tire receiving platform.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be

BRIEF DESCRIPTION OF THE PREFERRED EMBODIMENT

Figure 2:
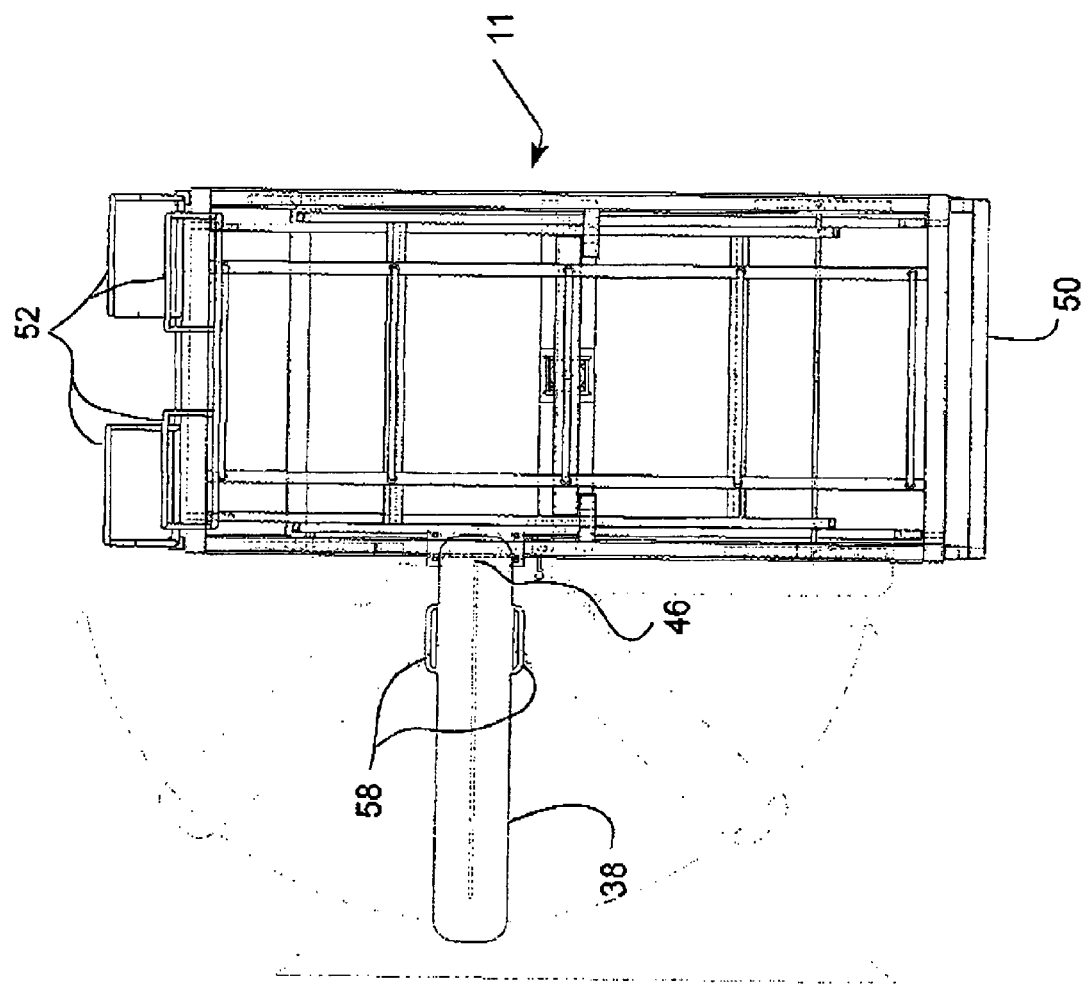
Figure 6A:
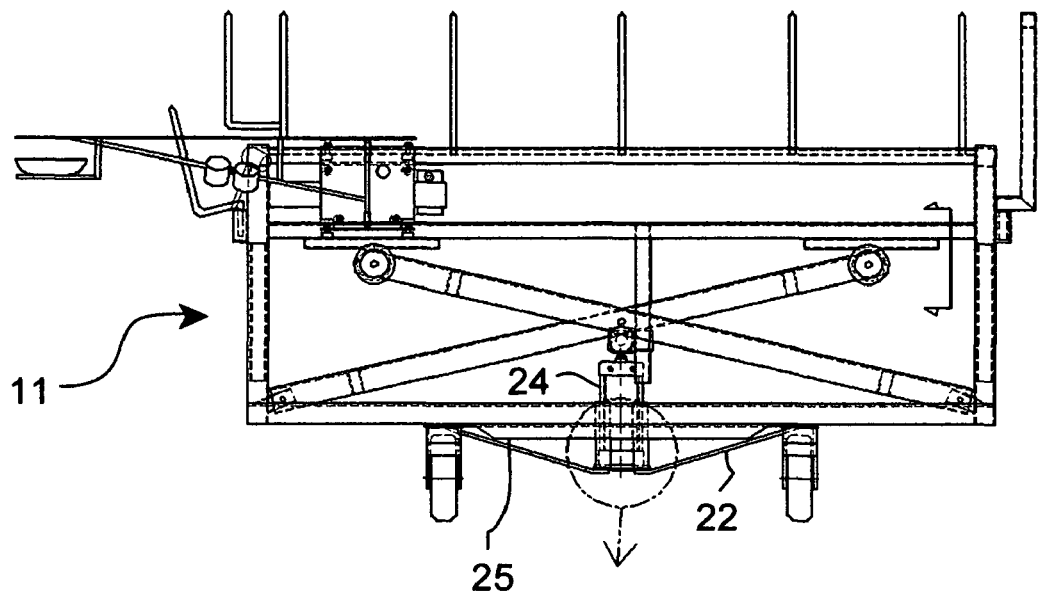
Figure 6B:
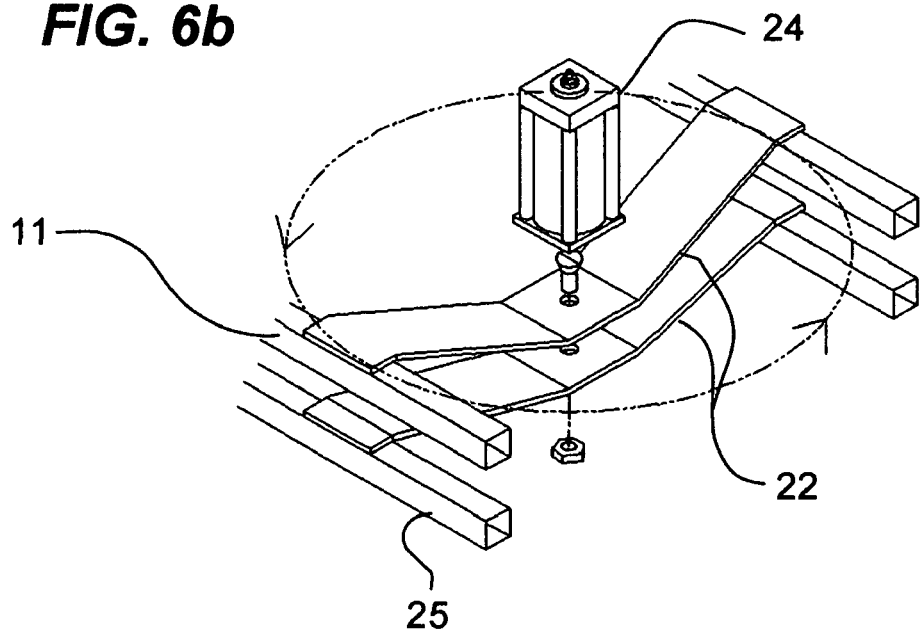
Figure 8:
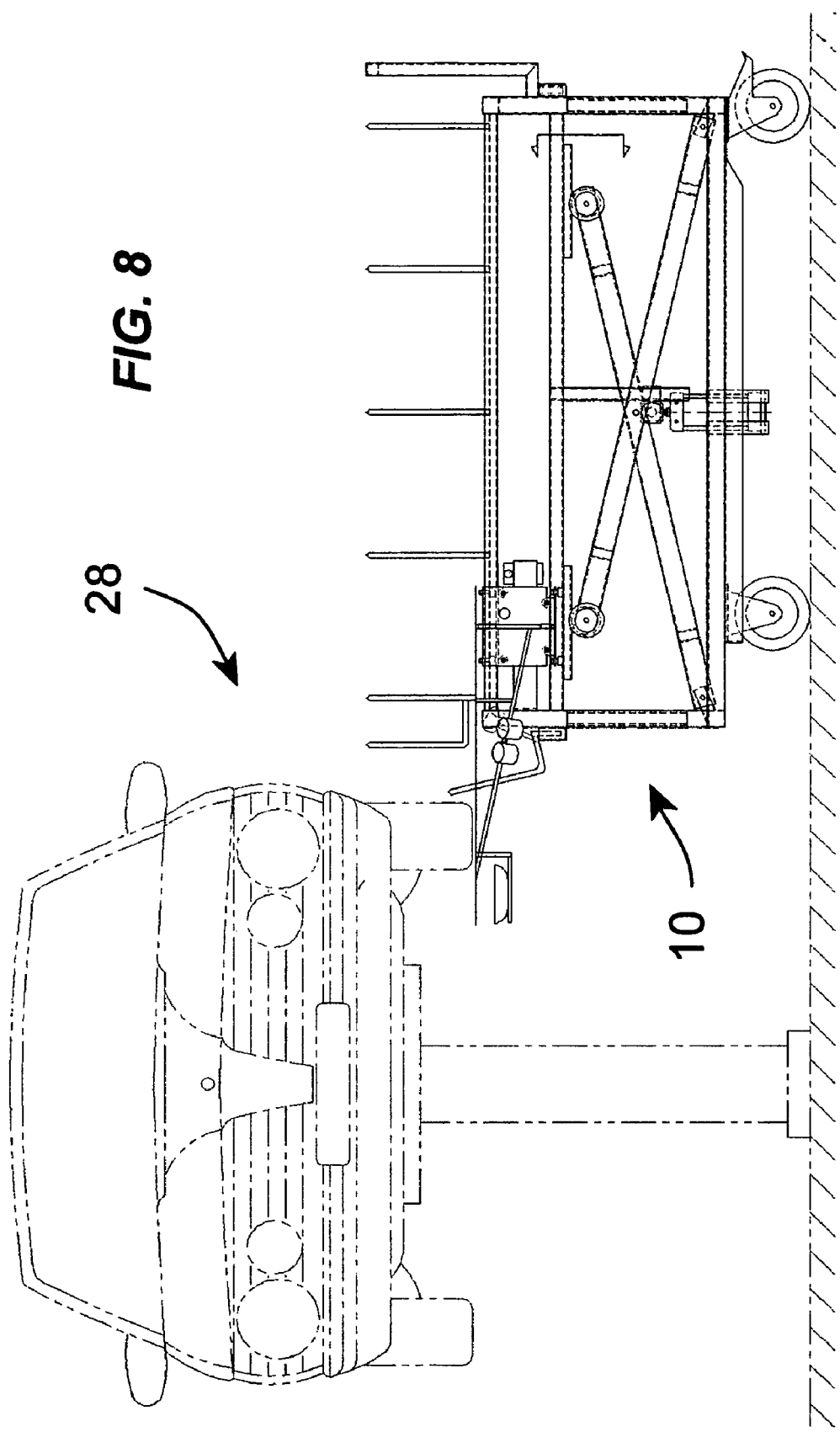

FIG. 1 Perspective view.
FIG. 2 Top view showing plank with different orientations.
FIG. 3 Side view.
FIG. 4 Cutaway view along line AA from FIG. 3.
FIG. 5 End view.
FIG. 6a Side view of structural body turned perpendicularly in relation to base.
FIG. 6b Cutaway detail exploded perspective view of FIG. 6a.
FIG. 7 End view with side of the car.
FIG. 8 Side view with front of the car.

DETAILED DESCRIPTION OF THE PREFERRED EMBODIMENT

A tire handling apparatus (10) represented by an assembly of tubular elements creating a structural body (11) composed of a hydraulically actuated scissor lift assembly (14) for adjusting the height of a tire receiving platform (16). The structural body (11) is further comprised of vertical members (18, 18') and horizontal members (20, 20') joined together to make up an upper body (12). The vertical members (18, 18') are further divided into upper vertical members (18) and lower vertical members (18') with the upper vertical members (18) perpendicularly attached to upper horizontal members (20) while lower vertical members (18') are perpendicularly attached to lower horizontal members (20') that form a lower body (13). The upper body raises or lowers telescopally in relation with the lower body (13), that is, the lower vertical members (18') cooperates telescopally with the upper vertical members (18) as the scissor lift assembly (14) raises or lowers. The scissor lift assembly (14) itself is supported by the lower body (13) to which it is rotationally attached. The lower body (13) also has cross beams (22) fixedly attached to it and which are used for supporting a hydraulic piston (24) which acts upon the scissor lift (14) for raising and lowering the tire receiving platform (16). Half of the cross beams (22) is fixedly attached to the lower body while the other half is fixedly attached to the base (25) and each half being able to rotate relative to the other half for reasons explained later. The scissor lift assembly (14) has casters (15) rolling off underneath horizontal tracks (21). The rest of the scissor lift assembly (14) being somewhat similar to such assemblies known in the art will not be further discussed here. The hydraulic piston (24) can be actuated by air hoses of the type commonly found in service stations or it can be pedal actuated as is also known in the art The tire handling apparatus (10) is mounted on wheels (32) set underneath the base (25) so that it can be moved from location to location as required.

The scissor lift assembly (14) lifts the tire receiving platform (16) to the preferred height of a given user. Once in place, a movable plank (38), that is generally stowed away in a configuration parallel to the structural body (11) when not in use, is moved outwardly in relation to the structural body (11) and placed underneath a tire (26) so as to receive it as it is removed from a vehicle (28). The movable plank (38) is slidingly attached to the horizontal tracks (21) that run longitudinally across the length of the tire receiving platform (16) so that it can align itself with any of a plurality of receiving niches (30). The movable plank (38) is slidingly attached by way of a slidable attachment means (34) using caster wheels (36) positioned strategically on various faces of the tracks (21). Such slidable or rollable attachment means are generally known in various fields and are adapted to the needs at hand, several variations can be used without departing from the scope of the invention.

For convenience, the movable plank (38) can be provided with a receptacle (40) for nuts and at least one holster (42) for hand tools such as hammer or pnematic drill. The movable plank (38) itself rotates along an axis point (46).

Each receiving niche (30) is separated from the adjacent ones by partition means (48). A push/pull bar (50) is removably attached from either ends of the structural body (12) and is used for moving the tire handling apparatus (10) about. Also removably attached to either ends of the structural body (12) are hubcap holders (52) for holding hubcaps (not shown). The push/pull bar (50) and the hubcap holders (52) can be installed on both ends of the structural body (12).

In operation, a worker will use the push/pull bar (50), to position the tire handling apparatus (10) alongside a vehicle (28), slide and pivot the movable plank (38) so that its tip is just underneath the tire (26). The worker can then proceed to remove the hubcap (not shown), if present, and then remove the nuts (not shown) using his air gun (not shown) in order to remove the tire (26), and put the nuts in the receptacle (40) and the air gun in the holster (42). At this point, the movable plank (38) can be raised so that it pushes the tire (26) slightly upward so as to help in freeing it from the bolts (not shown) so that it can be removed. From there, the tire (26) can easily be rolled onto said movable plank (38) and into an empty receiving niche (30) by sliding the movable plank (38) in line with an empty receiving niche (30). Positioning the movable plank (38) underneath the tire (26) can imply using a combination of moving the tire handling apparatus (10) and pivoting and sliding the movable plank (38) as well as adjusting the height of the structural body (12) by raising or lowering the scissor lift assembly (14) by way of actuation of the hydraulic piston (24). The worker can then lower the movable plank (38) and move the tire handling apparatus (10) towards the next tire to change.

Once all tires are removed, the tire handling apparatus (10) can be used to carry the tires to other locations such as the hub removing machine, tire balancing machine, or even storage. By adjusting the height of the tire handling apparatus (10) unloading or offloading tires to and from any of these machines is much easier.

The push/pull bar (50) can be switched from one end of the tire handling apparatus to the other and the movable plank (38) has handles (58) on both sides so as to favor left handed as well as right handed workers. Because only two out of the four wheels (32) are directional, it is necessary to swivel the tire handling apparatus (10) half a turn over the base (25) which is rotationally attached to the lower body (13) by way of the cross beams (22) having each halves rotating in relation to the other half as described hereinabove. Also, the receptacle (40) can be magnetized to better hold the nuts.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A tire handling apparatus comprising:
    a structural body composed of a hydraulically actuated scissor lift assembly for adjusting the height of a tire receiving platform;
    said structural body further comprised of vertical members and horizontal members joined together to make up an upper body;
    said vertical members being further divided into upper vertical members and lower vertical members and said horizontal members being further divided into upper horizontal members and lower horizontal members with said upper vertical members being perpendicularly attached to said upper horizontal members and lower vertical members being perpendicularly attached to said lower horizontal members so as to form a lower body;
    said upper body raising or lowering telescopically in relation with said lower body as said scissor lift assembly raises or lowers, rolling off underneath horizontal tracks on casters;
    said scissor lift assembly being rotationally attached to said lower body;
    a first and a second cross beam;
    said first cross beam being fixedly attached to a base;
    said second cross beam being fixedly attached to said lower body;
    said first and second cross beams supporting a hydraulic piston;
    said hydraulic piston actuating said scissor lift for raising and lowering said tire receiving platform;
    a movable plank rotating along an axis point and moving outwardly in relation to said structural body;
    said movable plank being slidingly attached to said horizontal tracks running longitudinally across the length of said tire receiving platform so as to align itself with any of a plurality of receiving niches;
    said plurality of receiving niches, each being separated from adjacent receiving niches by partition means.

2. A tire handling apparatus as in claim 1 wherein:
    said movable plank being slidingly attached by way of a slidable attachment means using caster wheels positioned on various faces of said horizontal tracks.

3. A tire handling apparatus as in claim 1 wherein:
    said tire handling apparatus being mounted on wheels set underneath said base.

4. A tire handling apparatus as in claim 1 wherein:
    a push/pull bar being removably attached to one end of said structural body so as to be installable on both ends of said structural body.

5. A tire handling apparatus as in claim 1 wherein:
    hubcap holders for holding hubcaps removably attached to one end of said structural body so as to be installable on both ends of said structural body.

6. A tire handling apparatus as in claim 1 wherein:
    said movable plank having a receptacle for nuts and at least one holster for hand tools.

7. A method of operating a tire handling apparatus wherein:
    providing the tire handling apparatus of claim 1;
    a user positions said movable plank underneath a tire using a combination of moving said tire handling apparatus and pivoting and sliding said movable plank;
    adjusts the height of said structural body by raising or lowering said scissor lift assembly by way of actuation of said hydraulic piston.

8. A method of operating a tire handling apparatus consisting in the steps of:
    providing the tire handling apparatus of claim 1;
    a user positions said tire handling apparatus alongside a vehicle;
    slides and pivots said movable plank so that its tip is just underneath a tire;
    said user removes said tire;
    said movable plank being raised so as to push said tire upward so as to help in removing said tire;
    said tire being roiled onto said movable plank and into an empty one of said plurality of receiving niches by sliding said movable plank in line with said empty one of said plurality of receiving niches.

* * * * *